Jan. 1, 1957   C. L. C. CHAPMAN   2,776,331
ELECTRODE BEARING CURRENT DISTRIBUTION
NETWORK AND METHOD OF PRODUCING SAME
Filed June 25, 1952
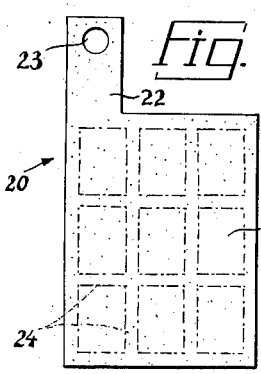
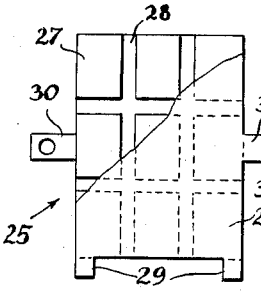
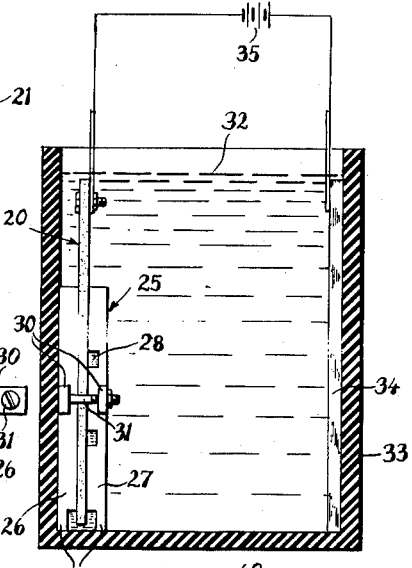
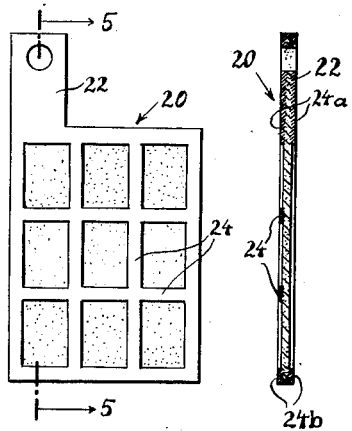
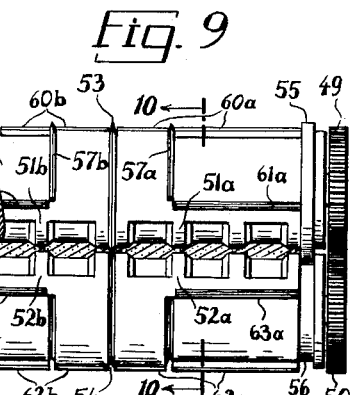
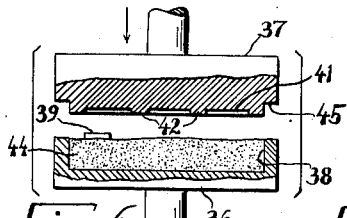
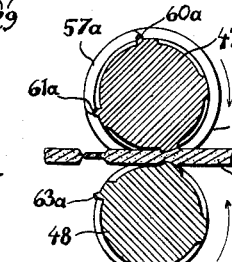
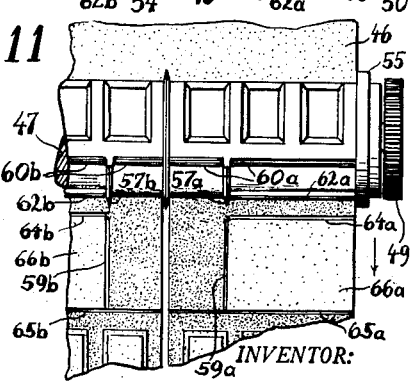
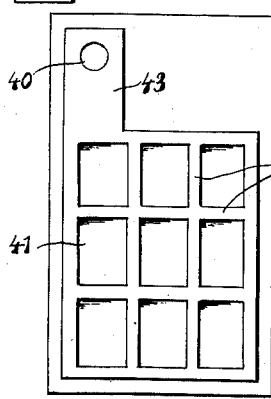
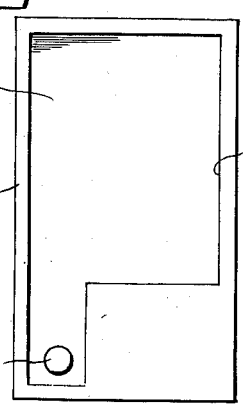
INVENTOR:
CHRISTOPHER L.C. CHAPMAN
BY
Carl F. Ross
AGENT United States Patent Office 2,776,331
Patented Jan. 1, 1957

2,776,331

ELECTRODE BEARING CURRENT DISTRIBUTION NETWORK AND METHOD OF PRODUCING SAME

Christopher Lionel Carter Chapman, Sutton, England, assignor to Yardney International Corp., New York, N. Y., a corporation of New York Application June 25, 1952, Serial No. 295,454

4 Claims. (Cl. 136—75)

The present invention relates to the manufacture of plates for electric batteries, rechargeable or other, and concerns more particularly plates of the type which are made by sintering pressed powders.

It is customary in such plates to provide means, such as a projecting lug or tab, for connecting the pressed powder of the plate to the terminal of the battery or accumulator in which the plate is used. Moreover, it is generally desirable to provide a current-conducting grid or network on or in the plate in order to afford a low-resistance path between the terminal lug or tab and the various portions of the plate the active material of which may be, at least during certain stages of the operating cycle, in a relatively poorly conducting state.

It has been customary heretofore to produce the desired result by embedding in the powdered material a grid, mesh or gauze of wires or strips of a highly conductive metal, the metal powder being pressed around the grid or the like and subsequently subjected to a sintering operation. An extension of the embedded network, not necessarily covered itself with the sintered powder, may form the terminal lug or tab. It has also been proposed to subject the edges of the pressed powder plate to a sufficiently higher degree of pressure than the main body of the plate so as to make these edges denser and, therefore, stronger and more rigid, the process serving at the same time for a firm anchoring of one or more grids or gauzes to said edges and, thereby, to the plate proper.

One of the disadvantages of the well-known methods and arrangements outlined hereinabove resides in the fact that the wire strips, gauze or grids add considerably to the weight of the finished plate and also increase the cost of production thereof. There is also the danger that the active material of the complete plate may become loosened or detached from the current-distributing network as a result of mechanical shocks and of the chemical processes taking place during the use of the battery. Moreover, the configuration of the current-distributing network, if it is to be produced in a practical and economical manner, is subject to definite limitations which may not always be compatible with maximum electrical efficiency.

The present invention has for its object to provide a novel type of sintered plate incorporating a current-distributing network which avoids the disadvantages set out above, as well as a method of producing such network.

According to the invention there is provided a method of forming a current distribution network on a plate of sintered material by densifying selected, intercommunicating strip portions on at least the surface of the plate, on either or both sides thereof, including, preferably, a lug or extension of the plate forming a terminal connection. This selective densification may be accomplished by depositing metal, preferably electrolytically, upon said selected portions or by additionally compressing same. In the first instance the electrolytically or otherwise deposited metal may be chemically identical with the sintered base material or, if desired, may be different, e. g. more highly conductive, provided objectionable local couples between the two dissimilar materials can be avoided. The second procedure is advantageous where the base material is a good conductor, e. g. copper or silver, and positively avoids all possibility of local chemical action such as may occur when grids, wires or strips are employed, owing to slight variations in the purity of the materials used; the additionally compressed strip portions, besides constituting a network of increased conductivity, will form channels facilitating the circulation of electrolyte when the plate is incorporated in an electrode assembly.

The invention will be described in detail with reference to the accompanying drawing in which:

Fig. 1 is an elevational view of a sintered electrode to be provided with a current-distributing network in accordance with the invention;

Fig. 2 shows a shield or fixture adapted to be used in electrolytically forming the network referred to;

Fig. 3 shows an electrolytic circuit for treating the electrode of Fig. 1, using the shield of Fig. 2;

Fig. 4 is a view similar to Fig. 1, showing the finished electrode;

Fig. 5 is a section on the line 5—5 of Fig. 4;

Fig. 6 shows a pair of plungers for producing an electrode similar to that of Fig. 1 but having a current-distributing network pressed into it;

Fig. 7 is a bottom view of the upper plunger of Fig. 6;

Fig. 8 is a top view of the lower plunger of Fig. 6;

Fig. 9 is a front elevation of a pair of rollers adapted to transform a sheet of sintered material into electrodes similar to those produceable by the arrangement of Fig. 6;

Fig. 10 is a section on the line 10—10 of Fig. 9; and

Fig. 11 is a top plan view of the arrangement of Figs. 9 and 10.

The plate 20, Fig. 1, consists of sintered electrode material, e. g. silver, and comprises a body portion 21 and a lug portion 22, the latter having a hole 23 to receive a terminal screw. Indicated in dot-dash lines is the current distribution network 24 which it is desired to produce on at least one of the faces of the plate 20.

A shield 25 of electrochemically inert material, Fig. 2, is adapted to be clamped or otherwise attached to the plate 20 for the purpose of masking major portions thereof while exposing interconnecting strip portions to the action of a suitable plating bath. As here shown the shield comprises a solid rear plate 26 of rectangular configuration, whose size is such as to cover all but a marginal area of the body portion 21 of electrode plate 20, and a coextensive front plate 27 provided with intersecting, horizontal and vertical grooves or channels 28 designed to afford the electrolyte access to selected portions of the electrode plate 20 when the same is received by the shield 25. The shield plates 26, 27 are supported on legs 29 and have lugs 30 adapted to be engaged by countersunk bolts 31, whereby the electrode plate 20 can be clamped between the shield plates as shown in Fig. 3.

In the latter figure the plate 20, sandwiched between the plates 26, 27, is shown immersed in a suitable plating solution 32 contained in a vessel 33, there being also present in this solution a plate 34 serving as an anode and connected to the cathode 20 through a source of current 35. The plate 34 may consist of solid metal chemically identical with the sintered materials, such as (in the example assumed) silver.

The solid rear plate 26 of shield 25 could, of course, be replaced by a channeled one, identical with plate 27, if plating of the network unto both electrode faces is desired.

The finished plate 20, with the network 24 plated onto one side thereof, is shown in Figs. 4 and 5. It will be noted that the lug portion 22, which had been fully exposed to the plating solution 32, is coated on both sides with the electrolytically deposited material, as indicated at 24a, and that marginal areas 24b are likewise so coated; all of these coatings 24, 24a, 24b, whose thickness has been exaggerated in Fig. 5, are interconnected. Fig. 5 also shows how the coating penetrates into the sintered material whereby the latter becomes densified to a certain depth; the transition between these denser regions and the remainder of the electrode will be more or less gradual.

The shield 25 may, of course, also be utilized for depositing the desired metal layer by different means, e. g. by spraying.

The method described above with reference to Figs. 1–5 has been claimed in a divisional application Serial No. 618,545, filed Oct. 26, 1956.

Figs. 6–8 show an arrangement adapted to form the sintered plate and its network in a single operation. A lower plunger or die 36, coacting with an upper plunger 37, has a cavity 38 having an outline which corresponds to that of electrode plate 20 including its lug portion 22; a pin 39, adapted to be received in a bore 40 of plunger 37, marks the position of the connecting hole 23. The upper plunger 37 has a raised portion or platform 41 which mates with the cavity 38, this platform bearing a network of ribs 42 corresponding to the desired current-distributing network 24. An extension 43 of the platform, which corresponds to the lug 22 and which contains the bore 40, is flush with the ribs 42.

In operation, the cavity 38 is initially filled with a powdered metal 44 and leveled off. Penetration of the platform 41 into the cavity 38 is limited by a shoulder 45 on the plunger 37 so positioned as to cause selected portions of the powder to be compressed, by the ribs 42 and the extension 43, to increase substantially the density of solid metal while subjecting the remainder of the powder to a compression sufficiently low as to leave it in a relatively spongy and porous state. As an example, if the material 44 is copper powder, then the areas to be compacted by the ribs 42 might be compressed to a density of approximately eight grams per cubic centimeter. After compression has thus been completed, the pressed plate is removed from the cavity 38 and subjected to heat treatment at a suitable temperature and for a sufficient period of time, in a furnace or oven not shown, to effect sintering of the powder.

It will be understood that a precompressed and sintered plate 20 such as shown in Fig. 1, consisting in its entirety of highly porous or spongy material, may be placed inside the cavity 38 in lieu of the powder 44, whereupon selected portions corresponding to lug 22 and network 24 will be additionally compressed by the projecting portions 42, 43 of the descending plunger 37; these additionally compressed portions should be subsequently annealed by further heating. It will also be appreciated that, in such case, the plate 20 may be additionally compressed between identical platens each similar to the platform of plunger 37, whereby channels similar to the grooves 28, Fig. 2, will be formed on both sides of the electrode plate. An arrangement of this type, using rollers instead of platens, has been illustrated in Figs. 9–11.

The arrangement of Figs. 9–11 is designed for producing a plurality of electrode plates from a single, precompressed sheet 46 of sintered material. An upper roller 47 and a lower roller 48, coupled by meshing gears 49, 50 for synchronous rotation, bear identical raised patterns each consisting, in turn, of several mirror-symmetrically disposed formations each similar to the formation 42, 43 on plunger 37 (Fig. 7). Adjacent formations, indicated at 51a, 51b on roller 47 and at 52a, 52b on roller 48, are separated from one another by cutter means for severing the finished electrode plates; these cutter means consist of a circular blade 53 on roller 47 mating with a peripheral groove 54 on roller 48. A peripheral ridge 55 on the upper roller, playing in a groove 56 on the lower roller, forms a lateral abutment for sheet 46 and also relieves the cutter means 53, 54 of stresses in maintaining axial alignment between the rollers. Arcuate blades 57a, 57b on roller 47, mating with corresponding grooves 58a, 58b on roller 48, serve to produce cuts 59a, 59b in the sheet 46 to help define the lug portions 22a, 22b. Axially extending ridges 60a, 60b and 61a, 61b on the upper roller, together with identical ridges 62a, 62b and 63a, 63b on the lower roller, co-operate to indent or to score the sheet 46 along lines 64a, 64b and 65a, 65b to facilitate separation of successively produced electrode plates and removal of a rectangular portion 66a, 66b from each plate to expose the lug portion thereof.

One or more pairs of feed rollers, not shown, may of course be used to help advance the sheet 46 through the presser rollers 47, 48.

It will thus be seen that with the rollers of Figs. 9–11 a sheet 46 of sintered, spongy material may be additionally compressed in selected areas to form intercommunicating regions of high conductivity and that, simultaneously, the sheet may be cut or at least weakened along lines defining individual electrode plates so as to enable ready separation of a plurality of simultaneously and/or successively produced plates.

As in the previously described case it will be desirable to subject the finished plates to further heat treatment, in order to anneal the metal of the more highly compressed portions thereof which may have undergone a certain amount of work hardening.

It will also be noted that in Figs. 9–11 the network-producing ridges have beveled edges so as to afford a more gradual transition in density, between the electrochemically active and the more highly conductive portions of the plate, than has been the case in Figs. 6–8. Evidently, sloping or beveled edges may also be employed in the latter arrangement if desired, even as cutting edges for trimming and/or separating the finished plates may be used in conjunction with plungers such as 37, 38. It should be understood, however, that the change in density in a plate produced in accordance with the invention will in no event be as abrupt as in known electrodes wherein strips or wires of solid metal are juxtaposed with the sintered material, so that undesirable mechanical stresses will be largely eliminated.

It will thus be seen that there has been disclosed a method of producing, in an efficient and inexpensive manner, one or more electrode plates of the character set forth wherein the spongy active portions and the highly conductive network, as well as the terminal lug forming an extension of said network, are firmly and securely anchored to one another, with the highly conductive portions, distinguished by their greater density, merging more or less gradually into the spongy portions of the plate. This merger, as will be readily understood, is due in the case of a deposited layer to a diffusion of the particles and in the case of a compressed network to a lateral spreading of the exerted pressure. The resulting plate is of light weight and low volume, compared with equivalent plates incorporating wires, grids or the like, and its network may have any desirable configuration inasmuch as only the shape of the indefinitely re-usable shield, plunger or roller has to be altered; substantially greater flexibility in design is thereby afforded.

The invention is, of course, not limited to the specific embodiments shown and described, some of whose features may be readily interchanged or otherwise modified without thereby departing from the spirit and scope of the appended claims.

What is claimed is:

1. A battery electrode comprising a self-supporting plate-like body composed of a plurality of integrally united panes, each consisting throughout its thickness of a porous spongy layer of silver particles, and each framed by a highly conductive network of silver integral therewith, said network of silver being composed of a series of interconnected strips of silver particles compressed to a density approximating that of silver metal, said entire body being annealed after formation with the silver particles sintered to one another.

2. The method of producing a self-supporting battery electrode composed in major part of silver and containing a plurality of spongy porous silver portions and a highly conductive network integral with the silver portions, which comprises the steps of compressing a plate-like mass of silver powder to a porous spongy layer, compressing selected areas of said layer into the shape of a network of interconnecting strip portions with a density approximating that of pure silver by passing the plate-like mass of silver powder between an upper roller and a lower roller coupled for synchronous rotation and bearing substantially identical raised patterns, each roller surface consisting of mirror-symmetrically disposed formations of axially and peripherally extending raised edges cooperating to indent the plate-like mass, the strip portions being arranged to form a framework surrounding the porous silver portions, and annealing the more highly compressed areas.

3. The method of producing a self-supporting battery electrode composed in major part of silver and containing a plurality of spongy porous silver portions and a highly conductive network integral with the silver portions, which comprises the steps of compressing a plate-like mass of silver powder to a porous spongy layer, compressing selected areas of said layer into the shape of a network of interconnecting strip portions with a density approximating that of pure silver, the strip portions being arranged to form a framework surrounding the porous silver portions, and then sintering the compressed plate-like mass of porous and strip portions and annealing the more highly compressed areas.

4. The method of producing a self-supporting battery electrode composed in major part of silver and containing a plurality of spongy porous silver portions and a highly conductive network integral with the silver portions, which comprises the steps of compressing a plate-like mass of silver powder to a porous spongy layer, compressing selected areas of said layer into the shape of a network of interconnecting strip portions with a density approximating that of pure silver by passing the plate-like mass of silver powder between an upper roller and a lower roller coupled for synchronous rotation and bearing substantially identical raised patterns, each roller surface consisting of mirror-symmetrically disposed formations of axially and peripherally extending raised edges cooperating to indent the plate-like mass, the strip portions being arranged to form a framework surrounding the porous silver portions, and then sintering the compressed plate-like mass of porous and strip portions.

References Cited in the file of this patent

UNITED STATES PATENTS

| | | |
|---|---|---|
| 1,366,490 | Pouchain | Jan. 25, 1921 |
| 2,544,112 | Schneider | Mar. 6, 1951 |
| 2,561,943 | Moulton et al. | July 24, 1951 |
| 2,681,375 | Vogt | June 15, 1954 |

OTHER REFERENCES

American Machinist, pages 99–103, Aug. 2, 1945.

Vinal, G. W.: Primary Batteries, John Wiley and Sons, New York, 1950, page 260.